Z. B. SIMS.
Corn and Cotton-Planters.

No. 139,620.  Patented June 3, 1873.

Attest:
Wm. J. Peyton
A. H. Norris

Inventor
Z. B. Sims
James L. Norris
Atty.

AM. PHOTO-LITHOGRAPHIC CO. N.Y. (OSBORNE'S PROCESS)

UNITED STATES PATENT OFFICE.

ZACHARIAH B. SIMS, OF BONHAM, TEXAS.

IMPROVEMENT IN CORN AND COTTON PLANTERS.

Specification forming part of Letters Patent No. 139,620, dated June 3, 1873; application filed November 21, 1872.

*To all whom it may concern:*

Be it known that I, ZACHARIAH B. SIMS, of Bonham, in the county of Fannin and State of Texas, have invented a new and useful Improvement in Seed-Planters, of which the following is a specification:

The object of this invention is an improvement in seed-planters, and consists of an arrangement of parts, the construction and operation of which is too fully hereinafter described to need preliminary explanation.

Figure 1:
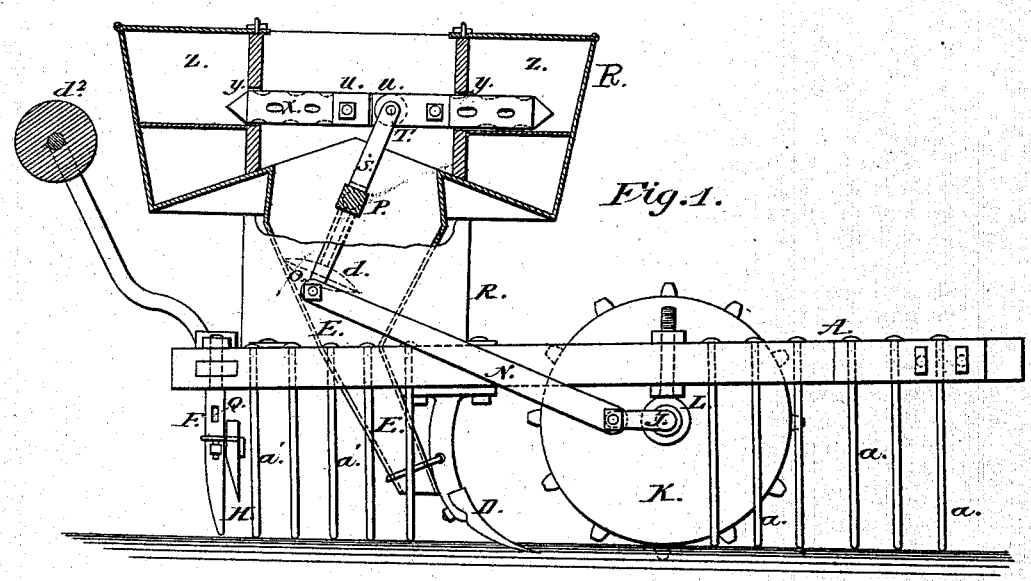
Figure 2:
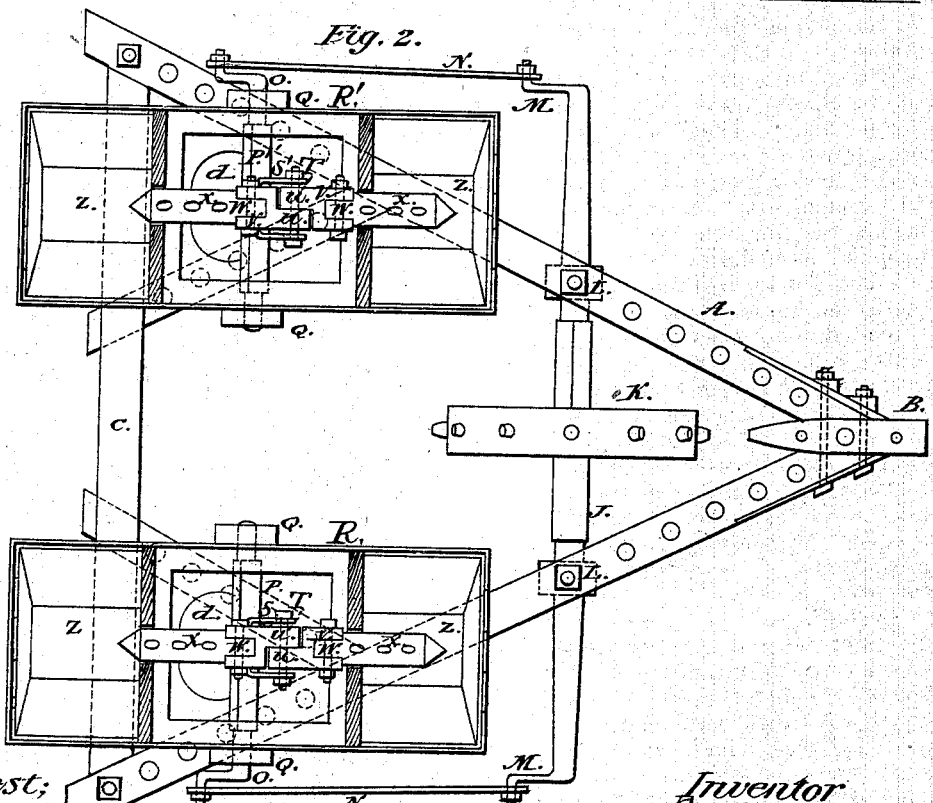

In the drawings, Figure 1 represents a side view, partly in section, of my improved seed-planter, and Fig. 2 a plan view thereof. The letters A A represent the triangular frame, made of any suitable material, and provided with harrow-teeth $a$ $a$. B is an adjustable wedge-shaped block, to which the draft is applied, and C is the adjustable rear brace. D D are plows attached by suitable shanks to the triangular frame, just in front of the rear harrow-teeth. These plows are capable of being adjusted vertically to regulate the depth of the furrow, and their shanks are connected with the spouts E E of the seed-hoppers by means of rings, so that the seed will be dropped immediately behind the plows into the furrow made by them. F F are shouldered-teeth, the upper ends of which are screw-threaded, and pass through the rear outer ends of the frame A, and are secured in place by nuts. The teeth F are provided with covering-boards H, secured to the teeth by staples, and are adjustable thereon by means of pins, which may be passed through any of the perforations or openings in the teeth F, for the purpose of regulating the depth of covering the seed. K is a driving-wheel provided with projections on its periphery and mounted on the transverse-axle J. The axle is journaled in eyebolts L, which pass through the side pieces of the frame A, and are screw-threaded at their upper extremities to receive nuts, by means of which the driving-wheel can be adjusted vertically. The ends of the shaft J are provided with short cranks M M, to which are attached the crank-rods N N, the inner ends of which are attached to the cranks O O on the rock-shafts P P', which have their bearings in uprights attached to the sides of the hoppers R R'. To the shafts P P' are attached the stirrups S S' across the opening, in the upper ends of which are the axles T T', having their bearings in the upper ends of the stirrup-pieces S S'. U U are arms journaled on the axles T, and have mortises or indentations V V in their outer ends, which receive the tenons W W of the feeders X X, the latter being pivoted to the arms U U by a bolt passing through the arms and the feeders at their mortise and tenon connection. The object of this jointed connection is to prevent binding of the feeders in the reciprocating movement given them in the openings $y$ $y$ of the hoppers Z Z. The crank-arms on the axle J have a rotary movement, while the cranks on the rock-shafts P P' have only an oscillating movement, which gives a reciprocating movement to the feeders through the rock-shafts. The feeders in their reciprocating movements operate in openings $y$ $y$, in the inner sides of their respective hoppers, their lower faces being flush with the bottoms of the hopper; and if the feeders are so inserted into the arm U U that the side faces having one and two indentations, but one or two grains of corn will be planted; but by removing the feeders, turning them half over and replacing them, five grains will be planted. To the lower face of the rock-shafts P P' are attached oval distributers $d$ $d$, on which the seed falls and passes down the spouts into the furrows made by the plows. The distributers, from their attachment to the rock-shafts P P', have a reciprocating or shaking motion, which throws off and distributes the seed.

What I claim as my invention, and desire to secure by Letters Patent, is—

In a seed-planter, the axle J, carrying an adjustable driving-wheel, K, and provided with the cranks M M, in combination with the rods N N, rock-shafts P P', stirrups S S', feeders $x$ $x$, and distributers $d$, all arranged and operating substantially as described, for the purpose set forth.

In testimony that I claim the foregoing, I have hereunto set my hand this 25th day of October, 1872.

ZACHARIAH B. SIMS.

Witnesses:
M. J. JACKSON,
ISAAC JOHNSON.